United States Patent [19]

McMullin et al.

[11] Patent Number: 4,584,164
[45] Date of Patent: Apr. 22, 1986

[54] VALVE CONTROL FOR LOW TEMPERATURE OVERPRESSURE PROTECTION IN A NUCLEAR POWER PLANT

[75] Inventors: Craig W. McMullin, Granby; Steven E. Weismantel, Bloomfield, both of Conn.

[73] Assignee: Combustion Engineering, Inc., Windsor, Conn.

[21] Appl. No.: 384,456

[22] Filed: Jun. 3, 1982

[51] Int. Cl.[4] .................. G21C 7/36; G21C 17/02; G21C 9/00
[52] U.S. Cl. .................. 376/216; 376/247; 376/283
[58] Field of Search .............. 376/207, 215, 216, 240, 376/245, 247, 277, 283, 402; 137/512.1, 551

[56] References Cited

U.S. PATENT DOCUMENTS

| | | | |
|---|---|---|---|
| 3,102,394 | 9/1963 | Hartfield et al. | 376/216 |
| 3,114,414 | 12/1963 | Judd | 376/402 |
| 3,998,694 | 12/1976 | Luger | 376/245 |
| 4,057,077 | 11/1977 | Schabert et al. | 376/277 |
| 4,146,049 | 3/1979 | Kruse et al. | 137/551 |
| 4,421,716 | 12/1983 | Hench et al. | 376/216 |
| 4,470,948 | 9/1984 | Aanstad et al. | 376/283 |

Primary Examiner—Charles T. Jordan
Assistant Examiner—Richard Klein
Attorney, Agent, or Firm—L. James Ristas

[57] ABSTRACT

A control system for overpressure protection of the reactor coolant boundary (14) in a nuclear power plant, comprising a pressure relief line (18a) having a power operated relief valve (24a) controlled by a circuit responsive to the condition of the reactor coolant and a control logic. The circuit includes a mode selector switch (80) having a NORMAL position (82) for establishing a full power overpressure relief valve setpoint (62) and a LTOP position (84) for establishing a low temperature overpressure relief setpoint (58). The control system logic opens the relief valve (24a) when (a) the mode switch is in the NORMAL position and the coolant pressure exceeds the full power setpoint (62), or (b) when the mode switch is in the LTOP position, the coolant temperature is less than a preselected value (52) and the coolant pressure exceeds the LTOP setpoint (58).

4 Claims, 6 Drawing Figures

VALVE CONTROL FOR LOW TEMPERATURE OVERPRESSURE PROTECTION IN A NUCLEAR POWER PLANT

BACKGROUND OF THE INVENTION

This invention relates to nuclear power plants, and more particularly to a valve control system for overpressure protection of a nuclear reactor coolant system.

In accordance with current industry code requirements, all nuclear power plants must have some form of overpressure protection when operating at normal (at power) system temperature and pressures. Overpressure protection is provided by the use of self-actuating safety valves which open at predetermined set pressures. In addition, overpressure protection is required even when the reactor is operating in low temperature modes such as during heatup or cooldown. This latter type of protection, often referred to as Low Temperature Overpressure Protection (LTOP), is intented to preclude the potential of brittle fracture of the nuclear steam supply system components.

SUMMARY OF THE INVENTION

The present invention is an overpressure protection system including multiple setpoint power operated relief valves (PORV'S) that are selectively aligned to protect the reactor coolant system from exceeding a predetermined maximum permitted pressure, $P_{BF}$, during low temperature cooldown or heatup, so as to avoid the potential for brittle fracture. This is defined as the LTOP protection mode. When the coolant system is at high temperature the overpressure protection system has a high pressure setpoint, $P_{FP}$; this mode is defined as the NORMAL mode. The temperature dependence of $P_{BF}$ is accommodated by a system control logic that is different in each of two well defined reactor coolant system operating regimes, i.e., NORMAL and LTOP. System control includes interlocks, and preferably alarms, to assure proper selection of and transition between the protection modes associated with the NORMAL and LTOP operating regimes.

In its broadest form, the protection system comprises a control circuit for a multiple set point, power operated relief valve located between the reactor coolant system piping or pressure boundary, and a quench tank or similar collector. The control means for operating each valve are responsive to the condition of the reactor coolant and a control logic. The control logic includes a mode selector switch for selecting either the NORMAL or LTOP mode according to the corresponding operating regime. During operation at power, the mode switch is kept in the NORMAL position and the relief valve setpoint is $P_{FP}$, corresponding to full power operation.

When the reactor unit is to be cooled down, the operator selects the LTOP mode as the temperature drops below the low temperature overpressure maximum, $T_M$. In the preferred embodiment, alarms sound to remind the operator to change the mode switch position. While in the LTOP mode, the control logic opens the relief valve when the temperature of the coolant is below the preselected value, $T_M$, and the coolant pressure is greater than a preselected value, $P_1$ (where $P_1 < P_{BF}$). Opening of the relief valve maintains reactor coolant pressure low enough to avoid brittle fracture.

When the reactor unit is to be heated up, valve alignment in the LTOP mode again assures that low temperature overpressure protection will be achieved, unitl the transition to the NORMAL mode is made for operation at power.

In the preferred embodiment, two relief valves are provided. Preferably, only the first power operated relief valve is aligned in the NORMAL mode, and the first and second power operated relief valves are aligned, but offset by about 30 psi setpoint difference, in the LTOP mode.

BRIEF DESCRIPTION OF THE DRAWINGS

The preferred embodiment of the invention will be described with reference to the several drawings, in which.

DESCRIPTION OF THE PREFERRED EMBODIMENT

Figure 1:
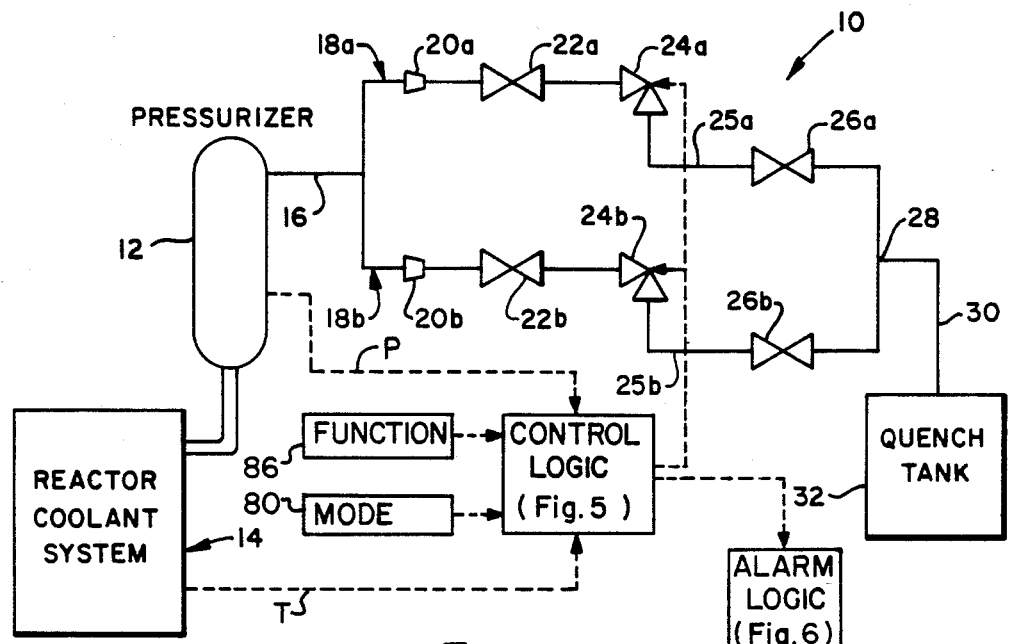
FIG. 1 is a schematic overview of the valve arrangement to be controlled in the preferred embodiment of the overpressure protection system.

Referring now to FIG. 1, there is shown schematically an overview of the preferred embodiment of the inventive protection system 10. A pressurizer 12, such as the type conventionally associated with a modern pressurized water reactor primary loop 14, typically contains a steam phase at saturated conditions above a liquid water phase. Spray nozzles and heater elements in such conventional pressurizer increase or decrease the temperature and pressure within the pressurizer and thus control the pressure in the reactor coolant system 14. In a typical embodiment, the reactor unit would normally generate thermal power at reactor coolant conditions of about 2250 psi at about 582° F.

In the illustrated protection system, a pressurizer nozzle 16 is connected to the top of the pressurizer 12 and splits into two parallel pressure relief lines 18a and 18b. Typically, nozzle 16 and lines 18a and 18b would be about 4 inches nominal diameter schedule 160 pipe. Each system line has a 4 inch×3 inch pipe reducer 20a,20b which preferrably connects to a 3 inch motor operated isolation valve 22a,22b respectively. The isolation valves open against a maximum pressure differential and close against maximum flow. Further downstream in each line 18a,18b is a multiple setpoint power operated relief valve (PORV) 24a,24b with, preferably, a 3 inch inlet and an 8 inch outlet. Two parallel 8 inch lines 25a, 25b from the relief valves 24a,24b may each have a downstream manual gate valve 26a,26b, respectively. The two system lines 18a,18b rejoin at 28 into one 10 inch line 30 which discharges into a quench tank 32 or similar collector.

The fluid flow aspects of the invention are further described immediately below, whereas the control features, represented by dashed signal lines and associated control means, are discussed in connection with FIGS. 5 and 6.

For the purpose of clarifying the present invention, it may be assumed that the gate valves 26a,26b are always open and not controlled by the protective system logic per se.

During normal power operation, only one relief valve 24a is aligned to the pressurizer 12, and is characterized in the illustrated embodiment by a 2400 psi setpoint, $P_{FP}$, which is above the full power rated pressure of 2250 psi. The other relief valve 24b is preferably isolated by a closed isolation valve 22b to prevent excessive reactor coolant from being relieved during any overpressure condition that might arise in the reactor coolant system.

During the startup and cooldown mode of plant operation, the overpressure protection system is switched to the LTOP mode whereby both relief valves 24a,24b are aligned to the pressurizer 12. The relief valve setpoints are at low pressures and staggered by about 30 psi. In the illustrated embodiment, the first relief valve 24a is set at $_1$=460 psia and, should it fail to lift as required, the second relief valve 24b, set at $P_2$=490 psia, will open.

Figure 2:
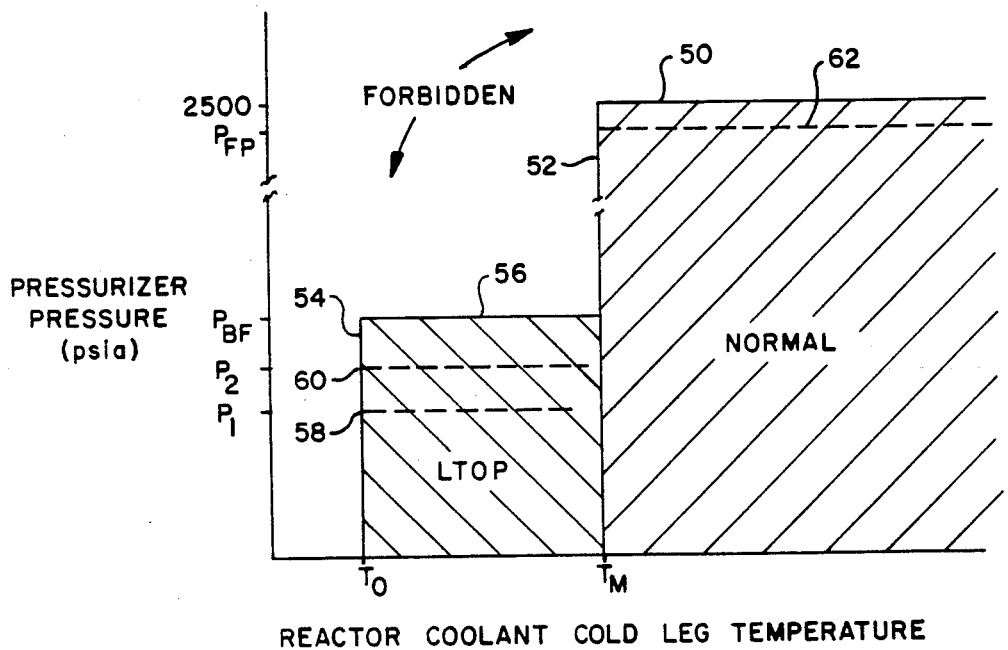
FIG. 2 is a schematic diagram showing the operating regimes and the valve set points associated with the overpressure protection system.

The meaning of LTOP mode is best understood with reference FIG. 2, which indicates pressurizer pressure (psia) on the ordinate and reactor coolant system cold leg temperature on the abscissa. The line 50 at 2500 psi represents the maximum permitted safety valve setpoint pressure for normal power operation, in accordance with code requirements. The vertical line 52 is the maximum temperature $T_M$ and the vertical line 54 is the minimum temperature $T_O$ defining the LTOP mode of operation. In the illustrated embodiment, the maximum temperature 52 is 280° F. and the minimum temperature 54 is 62° F. These temperatures may vary from plant to plant, and are taken from plant specific operating conditions such as those to be described in connection with FIG. 3.

The LTOP region bounded by the low and high temperatures 54,52 and the maximum pressure 56 to prevent brittle fracture is cross-hatched to define the conditions requiring the LTOP mode of overpressure protection. The relief valve 24a having the low LTOP setpoint pressure of 460 psia is represented at 58 and the relief valve 24b with the 490 psia setpoint is represented at 60. Operation in the oppositely cross-hatched NORMAL region is with a single high pressure set point 62 at $P_{FP}$=2400 psi on relief valve 24a.

The protection system of the present invention assures that all transitions from NORMAL to LTOP, or LTOP to NORMAL operating conditions, stay within the desired crosshatched regions.

Figure 3:
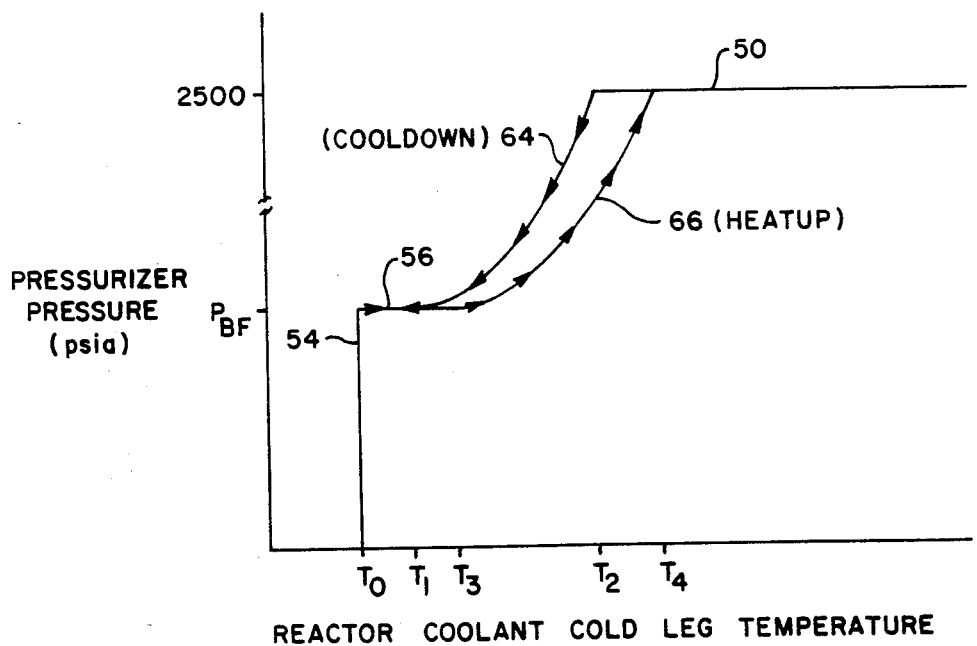
FIG. 3 is a schematic diagram of the temperature-dependence of the maximum operating pressure above which brittle fracture of the reactor coolant system components may occur.

FIG. 3 illustrates the conventional operating limits on coolant system maximum pressure, with boundaries corresponding to those on FIG. 2 correspondingly numbered. This type of overpressure limit curve has three portions: the high pressure boundary 50 at 2500 psi; the low temperature boundary 56 at $P_{BF}$; and a curved or sloped transition boundary 64. The shape of the sloped portion is slightly different depending on whether the plant is cooling down 64, or heating up 66. These curves are plant-specific and are established based on the expected metallurgical behavior of the components of the plant.

The plant operating procedure associated with the invention will now be described with reference to FIGS. 1,2 and 3. During cooldown, reactor coolant system pressure is descreased in the NORMAL region to below the relief valve low pressure setpoint ($P_1$=460 psi) before cooling the plant to below the maximum temperature for LTOP ($T_M = T_2$). Once temperature is lower, the relief valves 24a,24b are aligned to the LTOP position. During subsequent heatup reactor coolant system pressure is maintained below the relief valve low pressure setpoint (460 psi) unitl the relief valve mode selector switch is aligned to the NORMAL position. The relief valves are reset to the NORMAL set point when cold leg temperature is above the maximum temperature for LTOP ($T_M = T_4$). In the preferred embodiment, the temperature boundary between the LTOP and NORMAL modes is $T_4$ during heatup and $T_2$ during cooldown, thereby providing the operator greater flexibility during cooldown.

The minimum required relief capacity for reactor coolant system overpressure protection considers the following mass and energy additions to a water-solid reactor coolant system: maximum high pressure safety injection pump delivery; charging pump flow with letdown isolated; full pressurizer heater impupt; and decay heat imput. The water relief capacity of one of the relief valves (24a,24b), is plant-dependent and preferably about 1420 gpm at 460 psia, which provides sufficient LTOP capacity. Each valve is also sufficient to provide steam relief during normal operation to mitigate minor pressure transients before the pressurizer safety valve (not shown) self actuates at about 2500 psi. The steam capacity of one relief valve 24a,24b is approximately 400,000 pounds per hour as 2400 psia.

Figure 4:
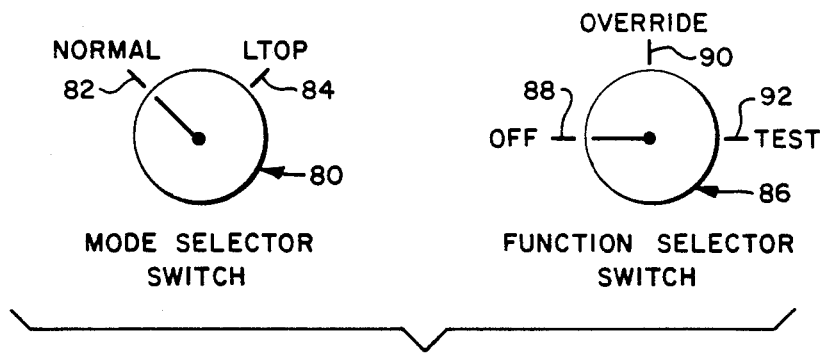
FIG. 4 is a schematic representation of the control switches associated with the preferred embodiment of the overpressure protection system.

Referring also to FIG. 4, the control functions of the system will be described. It should be appreciated that satisfactory overpressure protection can be achieved with only one line 18a between the pressurizer 12 and the quench tank 32, if the associated valve 24a is controlled according to the logic set forth below in connection with the preferred embodiment.

Each relief valve 24a,24b has a mode indication switch 80, either NORMAL 82 or LTOP 84, and a separate function selector switch 86 for off 88, override 90, or test 92. The mode selector switch 80 is placed in NORMAL 82 when the plant is at power and during heatup and cooldown operations when not in the LTOP mode. The LTOP position 84 is used in the LTOP mode as previously described. The function switch 86 provides a manually generated artificial signal to close the relief valve and enables a test signal to be introduced to the control circuitry without actuating the valve. The "off" position 88 is used in the NORMAL and LTOP mode of operation when the relief valve control circuitry testing is not desired. The "override" position 90 automatically closes the relief valve if it is open and overrides any signal to open the valve. The test position 92 simulates an open signal to the relief valve without physically opening the valve in either the NORMAL or LTOP mode of operation.

Figure 5:
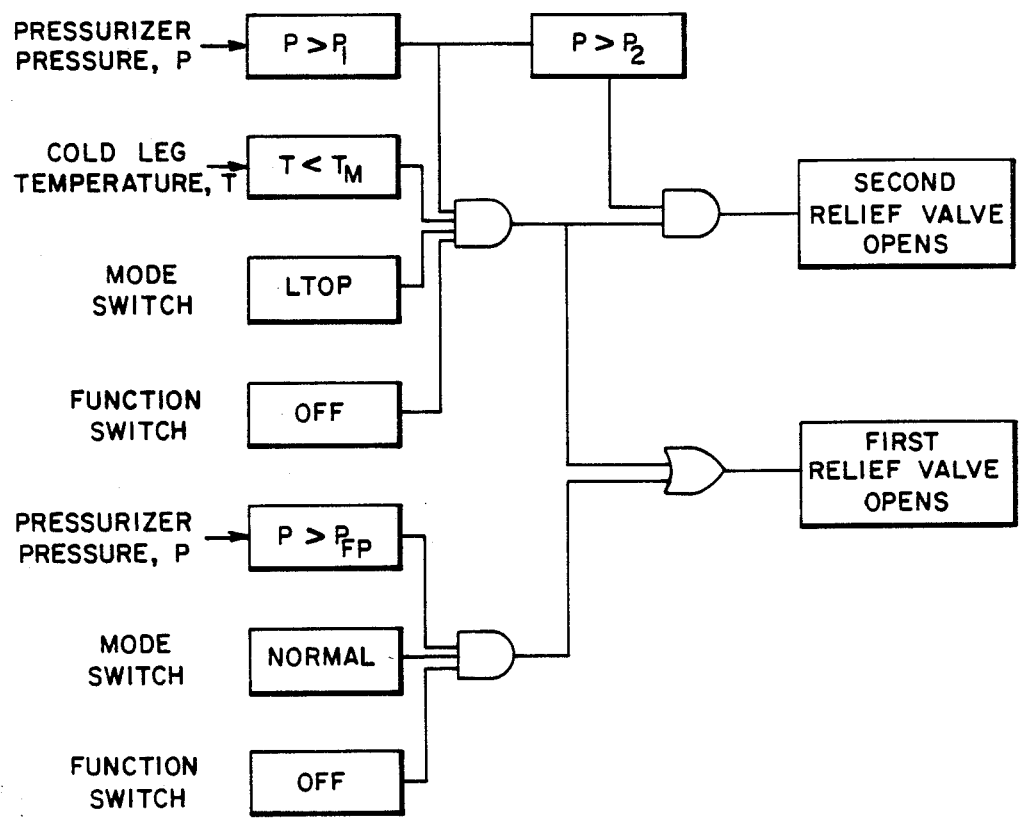
FIG. 5 is a logic diagram showing the dependence of the relief valve actuation on reactor coolant operating conditions and control switch position, in the preferred embodiment of the invention.
Figure 6:
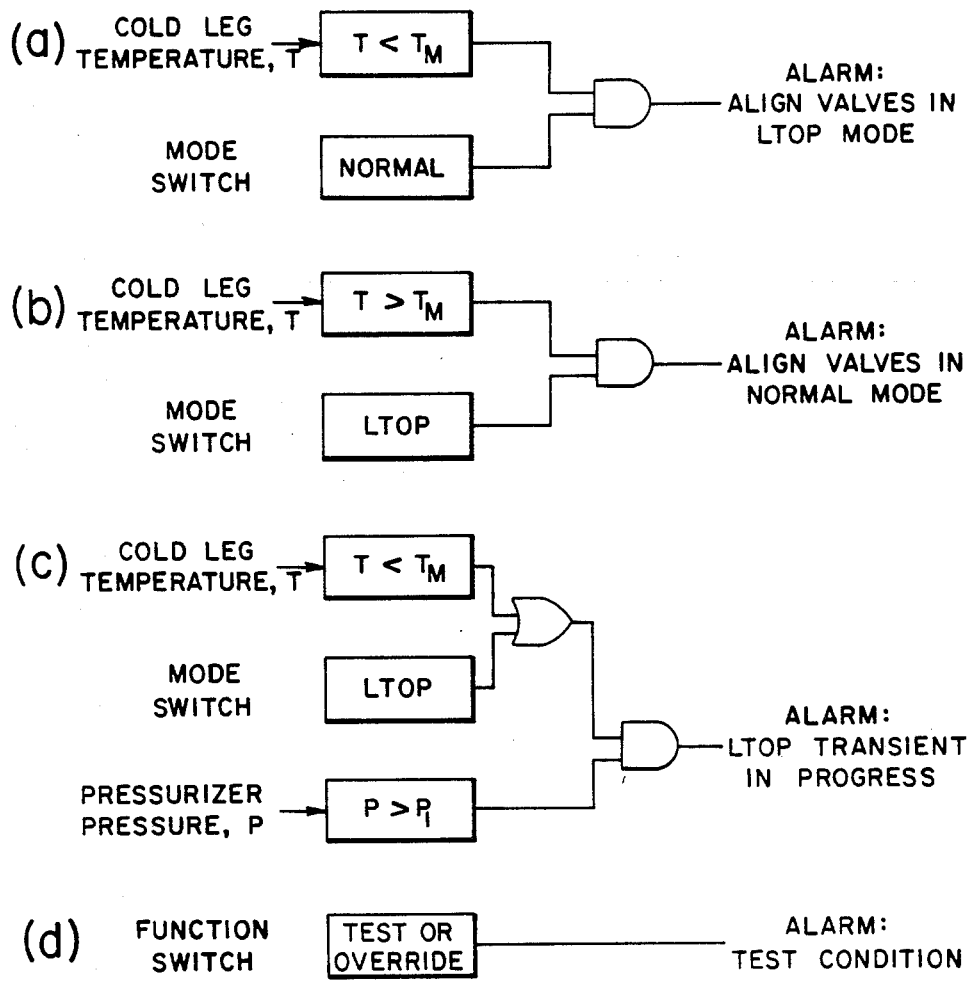
FIG. 6 is a logic diagram showing the dependence of the alarm actuation on the reactor coolant operating conditions and control switch positions, in the preferred embodiment of the invention.

FIGS. 5 and 6 diagrammatically illustrate the logic and alarm features of the control system as generally represented in FIG. 1. As shown in FIG. 5 an interlock is provided in the control logic to prevent relief valve actuation when the cold leg temperature is greater than $T_M$ and the mode selector switch is inadvertently positioned to LTOP. The normal 2400 psia setpoint ($P_{FP}$) remains in effect during the period that this interlock is in effect. The interlock resets when cold leg temperature drops below $T_M$. In the LTOP mode, when the function switch is off and the temperature T is less than $T_M$, a pressure increase P greater than $P_1$ opens the first relief valve 24a and a pressure P greater than $P_2$ additionally opens the second relief valve 24b. If only one line 18a is used, the redundant LTOP protection afforded by valve 24b opening at $P>P_2$ is not available.

Referring now to FIG. 6a, during cooldown when the mode selector switch is in the NORMAL position and cold leg temperature T reaches a value less than $T_M$ a PORV LTOP condition alarm alerts the operator to select LTOP on the mode selector switch.

During heatup when the mode selector switch is in the LTOP position and cold leg temperature reaches a value greater than $T_M$ (see FIG. 6b) a PORV NORMAL condition alarm alerts the operator to select NORMAL on the mode selector switch.

When the reactor coolant system cold leg temperature is less than $T_M$ or the mode selector is in the LTOP position and pressurizer pressure is grater than 460 psi ($P_1$), an LTOP transient is occuring, actuating the LTOP transient alarm (see FIG. 6c).

A PORV test condition alarm (FIG. 6 d) alerts the operator whenever the PORV protection system is in the override or test position, bypassing all setpoints. The PORV remains closed in this condition until the function selector switch is placed in the off position at which time the alarm will clear.

Thus the electrical instrumentation and control system provides alarm indication means to alert the operator that he must:

a. Align the system at the correct plant condition during cooldown. The operator is made aware by the use of an alarm that the reactor coolant system is in a condition in which the control logic for the LTOP protection system is aligned;

b. Disable the system at the correct plant condition during heatup. The operator is made aware by the use of an alarm that the reactor coolant system is in a condition in which the control logic for the LTOP protection system is positioned to the normal mode of operation;

c. Indicate if a pressure transient is occuring;

d. Indicate to the operator that the relief valves are in an override/test condition.

We claim:

1. In a nuclear power plant having a reactor coolant system and associated coolant pressure boundary, a control system for overpressure protection of the reactor coolant boundary to prevent violating a prescribed pressure-temperature relationship, comprising:

a relief nozzle connected to the reactor coolant boundary;

a fluid collector remote from the reactor coolant boundary;

first and second system relief lines connected in parallel between the nozzle and the collector, the relief lines having respective first and second power operated relief valves;

control means for operating each of said power relief valves, said control means including logic means responsive to signals indicative of the pressure and temperature of the reactor coolant, a mode selector switch for selecting either normal or low temperature overpressure protection, and a function selector switch having an off position and a position for selectively introducing a simulated overpressure signal to said logic means;

wherein said control means opens the first relief valve when (a) the function selector switch is off and (b) the mode selector switch is in the normal position and (c) the coolant pressure is greater than a set point value $P_{FP}$ above the pressure corresponding to full power operation; and wherein said control means opens at least the first relief valve when (a) the function selector switch if off and (b) the mode selector switch is in the lower temperature overpressure protection position, (c) the temperature of the coolant is less than a preselected value $T_M$ and (d) the pressure of he coolant is greater than a preselected value $P_1$ less than $P_{FP}$ whereby the opening of the first or first and second valves provides a conduit path to discharge coolant from the reactor coolant system to the fluid collector for reducing the pressure in the coolant system.

2. The control system of claim 1 further including means for comparing the system pressure with a preselected value $P_2$, where $P_2$ is greater than $P_1$ and less than the maximum permitted pressure during low temperature cool down or heat up such that when the mode selector switch is in the low temperature overpressure protection position, the control means opens said second relief valve only when the pressure of the coolant is greater than $P_2$, whereby the first and second relief valves are opened sequentially to relieve a low temperature overpressure condition.

3. The system of claim 1 further including alarm indicator means associated with said control means for indicating the status of the system, comprising:

a first status annunciator means actuated when the mode selector switch is in the normal position and the coolant temperature is less than $T_M$ thereby indicating that the mode selector switch should be placed in the low temperature overpressure protection position; and second status annunciator means actuated when the mode selector switch is in the low temperature overpressure protection position and the coolant temperature is greater than $T_M$, thereby indicating that the mode selector switch should be placed in the normal position.

4. The system of claim 3 further including alarm indicator means associated with said control means for indicating the occurance of a low temperature overpressure transient, comprising a third status annunciator means actuated when the mode switch is in the low temperature overpressure position or the coolant temperature is less than $T_M$, and the coolant pressure is greater than $P_1$.

* * * * *